United States Patent [19]

Takagi et al.

[11] Patent Number: 4,563,387

[45] Date of Patent: Jan. 7, 1986

[54] CUSHIONING MATERIAL

[75] Inventors: Sadaaki Takagi, Okazaki; Shigetsugu Yura, Aichi; Masaki Fukuda; Yukio Oikawa, both of Okazaki, all of Japan

[73] Assignee: Takagi Chemicals, Inc., Okazaki, Japan

[21] Appl. No.: 624,970

[22] Filed: Jun. 27, 1984

[30] Foreign Application Priority Data

Jun. 30, 1983 [JP] Japan ................. 58-118798

[51] Int. Cl.⁴ .................. D04H 1/48; D04H 1/64
[52] U.S. Cl. ........................ 428/300; 5/461;
5/464; 5/DIG. 2; 156/62.8; 264/258; 428/302;
428/339; 428/340
[58] Field of Search ............. 5/461, 464, DIG. 2;
428/300, 302, 339, 340; 156/62.8; 264/258

[56] References Cited

U.S. PATENT DOCUMENTS

| 4,172,174 | 10/1979 | Takagi et al. | 428/288 |
| 4,298,418 | 11/1981 | Takagi et al. | 264/128 |
| 4,386,041 | 5/1983 | Takagi et al. | 264/128 |

FOREIGN PATENT DOCUMENTS

| 101164 | 8/1977 | Japan . |
| 148449 | 10/1980 | Japan . |
| 90661 | 6/1982 | Japan . |
| 90662 | 6/1982 | Japan . |
| 90663 | 6/1982 | Japan . |
| 90664 | 6/1982 | Japan . |
| 142945 | 9/1982 | Japan . |
| 142946 | 9/1982 | Japan . |
| 146558 | 9/1982 | Japan . |

Primary Examiner—James C. Cannon
Attorney, Agent, or Firm—Gordon W. Hueschen

[57] ABSTRACT

A cushioning material, comprising a lower filament cushioning layer of relatively high rigidity and high perviousness to air obtained by compression molding in a stated shape three-dimensional curled short fibers of polyester filaments of a relatively large denier number thereby producing a shaped mass of filaments and applying adhesive agent to the shaped mass thereby binding the points of mutual contact of filaments therein and an upper filament cushioning layer of relatively low rigidity obtained by compression molding in a stated shape three-dimensionally curled short fibers of polyester filaments of a smaller denier number than said polyester filaments thereby producing a shaped mass of filaments and applying adhesive agent to the shaped mass thereby binding the points of mutual contact of filaments therein, with said upper layer superposed on said lower layer.

6 Claims, 7 Drawing Figures

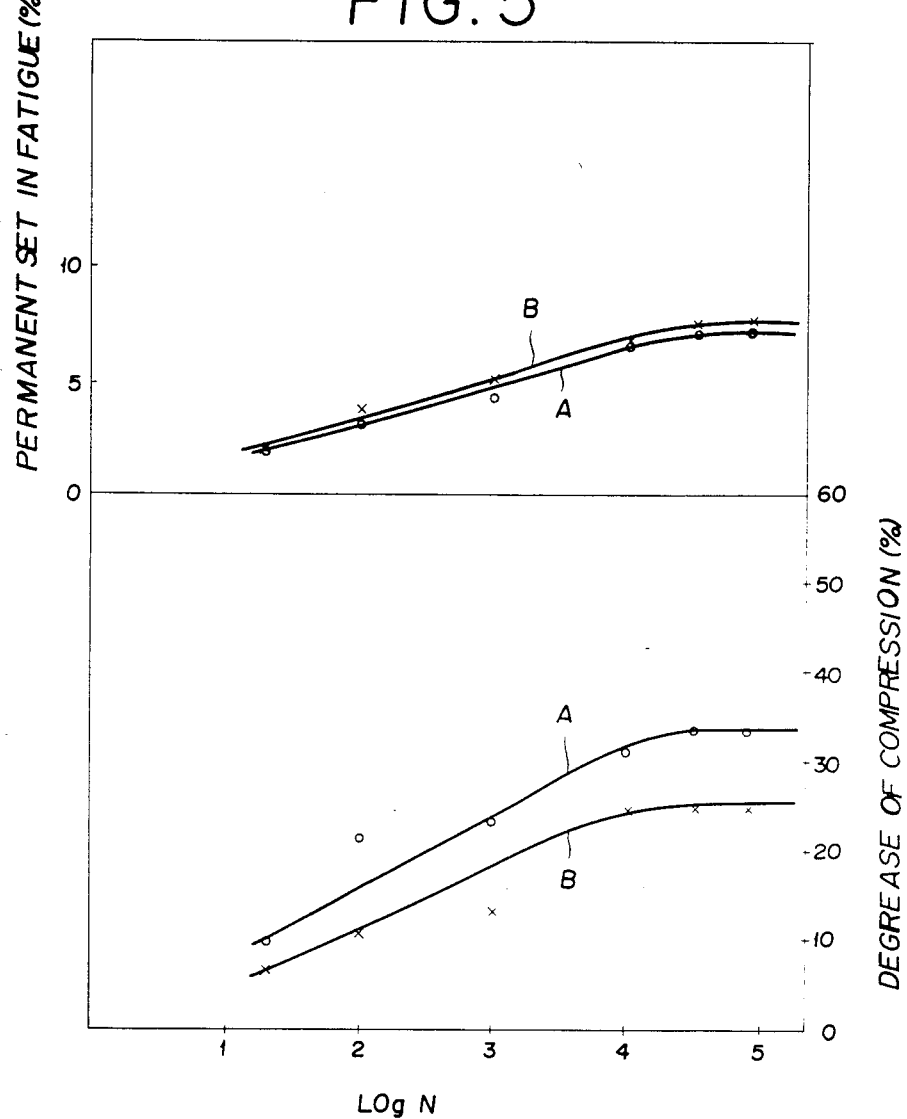

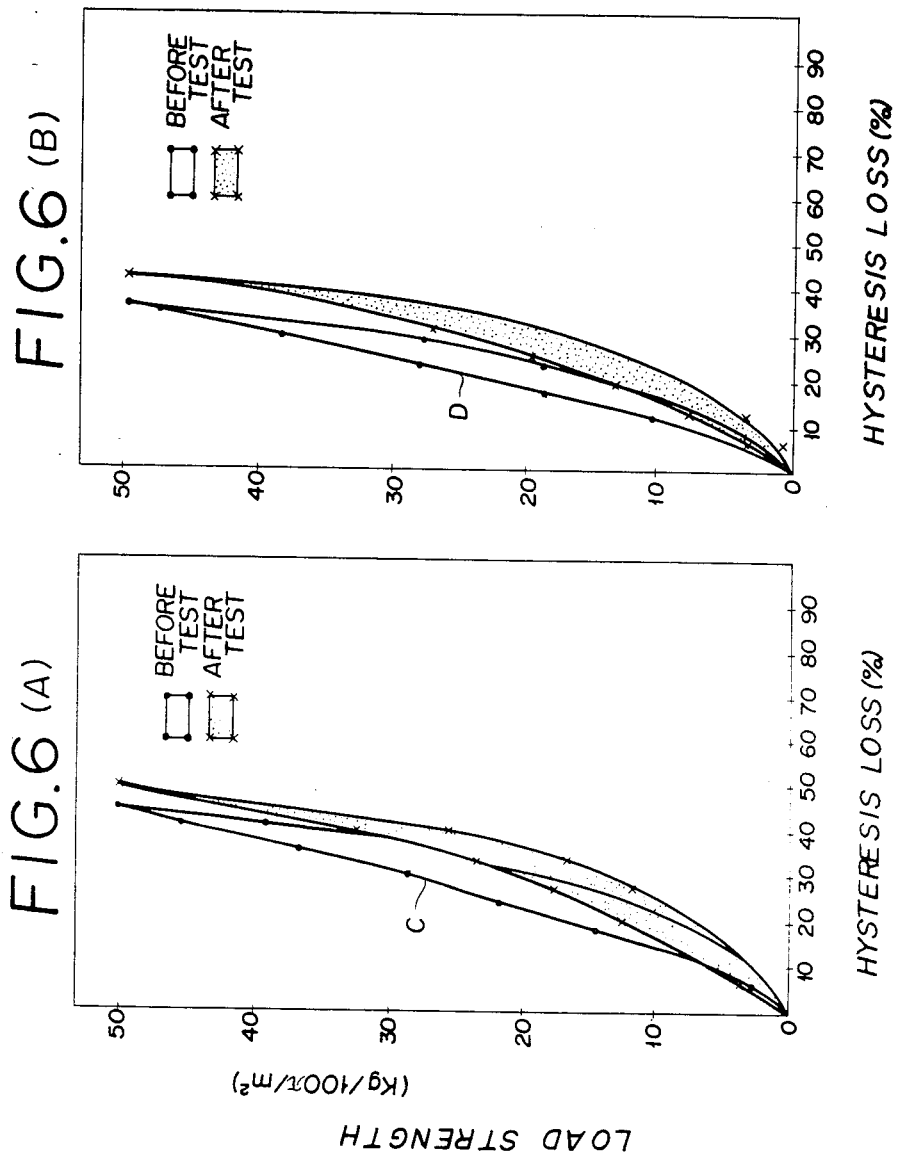

CUSHIONING MATERIAL

BACKGROUND OF THE INVENTION

1. Field of the Invention

This invention relates to a cushioning material. More particularly, this invention relates to a cushioning material excellent in perviousness to air and in durability and usable as in automotive seats.

2. Description of Prior Arts

The seats heretofore used in automobiles and other vehicles have been preponderantly of the type being mounted on springs stretched taut in a frame a seat proper which comprises a cushion support member made of a plain weave of polyethylene or polypropylene tapes or of Palmlock material, a slab of polyurethane foam superposed on the cushion support member, and a surface coating material covering the surface of the slab of polyurethane foam. Since the component materials used in the seat of this type all lack perviousness to air, the seat passes air sparingly and fails to cause diffusion of the body heat of the rider or the ambient heat and compels the rider to feel uncomfortable. Further, since the cushioning material in the aforementioned seat proper is mainly made of polyurethane foam, when it is directly placed on the aforementioned springs, it will suffer the polyurethane foam to sustain cuts in the surface exposed to direct contact with the springs after prolonged use in that state. To avoid direct contact of the polyurethane foam with the springs, the seat proper is used by interposing between the polyurethane foam and the springs a cushion support material made of Palmlock material, non-woven fabric of polyethylene or hessian cloth (plain weave) of polyethylene or polypropylene. The use of this cushion support material not merely increases cost but also impairs the cushioning property of the seat proper. Moreover, this material prevents the seat proper from manifesting an ability to diffuse air reaching from below. Further, since polyurethane has lower elasticity to resist pressure than the cushion support material of fibers, the aforementioned slab of polyurethane foam is required to possess a large thickness to offer desirable cushioning property. The combined thickness of this slab of polyurethane foam and the cushion support material, therefore, gives a large height to the seat and consequently necessitates an increase in the height of the vehicle as a whole.

A cushioning material which is formed by integrally joining a lock material of short synthetic fibers as an upper seat layer to at least part of the surface of a substrate of Palmlock material (Published unexamined Japanese Patent Application No. SHO 52(1977)-101,164) has been known as a cushioning material enjoying relatively high perviousness to air. This cushioning material, however, is so heavy and hygroscopic as to render desired reduction in weight of the automobile difficult and jeopardize durability of the seat, mainly because its substrate is made of Palmlock material. Particularly this cushioning material has suffered from the disadvantage that, after a protracted use, it yields to the phenomenon called "permanent set in fatigue" and experiences loss of cushioning property and toughness desired. It is further defective in respect that it fails to offer desired perviousness to air.

One of the present inventors formerly developed a cushioning material highly pervious to air (U.S. Pat. Nos. 4,172,174, 4,298,418 and 4,386,041 and U.S. Ser. No. 292,907). One of his inventions covering this cushioning material relates to a reinforced cushioning material comprising a compression molded body of drafted three-dimensionally crimped filament mass of a synthetic fiber in which the crimped filaments are of stable length and randomly-oriented and the contact points between each of the filaments are bonded with an adhesive, said body having isolated zones in which the crimped filament is further crimped in situ into various shapes formed by partially expanding and compressing the filament crimps in said zones, and said zones being distributed throughout the reinforced portion of said body, being oriented in the same direction, and having increased density in the degree of entanglement and the number of contact points.

By taking notice of the fact that this cushioning material, used in the vehicular seat, exhibits high perviousness to air, the inventor further developed a seat capable of being air conditioned with cool air or warm air introduced into the interior of the seat (Published unexamined Japanese Utility Model Application Nos. SHO 55(1980)-148,449, SHO 57(1982)-90,661 through 90,664, SHO 57(1982)-142,945 through 142,946 and SHO 57(1982)-146,558).

The aforementioned cushioning material, however, has the disadvantage that the perviousness to air is lowered when the bulk density of the cushioning material is increased for the purpose of improving the durability and this durability is lowered when the bulk density is lowered for the purpose of improving the perviousness to air.

An object of this invention, therefore, is to provide a novel cushioning material.

Another object of this invention is to provide a cushioning material excellent in perviousness to air and in durability and usable such as in automotive seats.

SUMMARY OF THE INVENTION

The objects described above are accomplished by a cushioning material which comprises a lower filament cushioning layer of relatively high rigidity and high perviousness to air obtained by compression molding in a stated shape three-dimensional curled short fibers of polyester filaments of a relatively large denier number thereby producing a shaped mass of filaments and applying adhesive agent to the shaped mass thereby binding the points of mutual contact of filaments therein and an upper filament cushioning layer of relatively low rigidity obtained by compression molding in a stated shape three-dimensionally curled short fibers of polyester filaments of a smaller denier number than the aforementioned polyester filaments thereby producing a shaped mass of filaments and applying adhesive agent to the shaped mass thereby binding the points of mutual contact of filaments therein, with the aforementioned upper layer superposed on the aforementioned lower layer.

BRIEF DESCRIPTION OF THE DRAWINGS

FIG. 5 is a graph showing the results of repeated compression test.

FIG. 6 (A) and (B) are graphs showing hysterisis loss.

PREFERRED EMBODIMENT OF THE INVENTION

Figure 1:
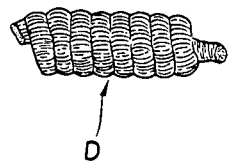
FIG. 1 is a perspective view of a double-twist filament.
Figure 2:
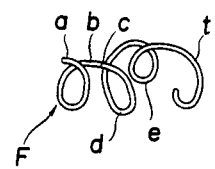
FIG. 2 is a perspective view of a three-dimensionally crimped filament.

Of the polyester filaments to be used in this invention, those for the upper filament cushioning layer are monofilaments of a size of 100 to 500 deniers, more desirably 200 to 400 deniers, and most desirably 250 to 350 deniers and those for the lower filament cushioning layer are monofilaments of a size of 300 to 2,000 deniers, more desirably 350 to 1,000 deniers, and most desirably 400 to 800 deniers. These monofilaments are in a three-dimensionally curled form. By the term "three-dimensional curls" as used herein is meant those three-dimensional curls in the broad sense of the word, such as two directional and three-directional curls, for example. A three-directional three-dimensionally crimped filament is preferred. For example, a three-directional three-dimensionally crimped filament F illustrated in FIG. 2 is obtained by preparing a double-twist filament D illustrated in FIG. 1 by use of a method and an apparatus disclosed by the same inventor in the specification of U.S. Pat. No. 4,154,051 and then cutting the double-twist filament D to a prescribed length and untwisting it. The cut filaments aggregated in the wad are desired to have a length within the range of from 25 to 200 mm, preferably from 60 to 150 mm. Thus, with reference to FIG. 2, the part of the filament at "a" coils over the part at "b." The part at "c" coils over the part at "d." The part at "e," however, coils under the part at "f" and not over it. Thus, the section of the filament from "e" to "d" falls under two bites or coils of the helix. This is what may properly be called a disoriented helix and is very much like a helical telephone cord which gets out of whack when one of the coils thereof becomes disoriented with respect to the others.

The upper and lower filament cushioning layers forming the cushioning material of this invention have a bulk density in the range of 0.02 to 0.4 g/cm$^3$, preferably 0.04 to 0.2 g/cm$^3$. Optionally, the lower layer may be in a greater bulk density than the upper layer, on condition that no increased bulk density should deprive the lower layer of its perviousness to air. Since, in this case, the bulk density is increased despite the small denier number of filaments, the perviousness to air is degraded while the elasticity is increased. The lower layer, however, is required to possess high elasticity to ensure repression of the phenomenon of "permanent set in fatigue." Thus, the lower layer must be formed of a compressed mass of polyester filaments of a large denier number which enjoys good perviousness to air for its bulk density. All told, it is desirable that the upper filament cushioning layer should possess a bulk density in the range of 0.02 to 0.08 g/cm$^3$, preferably 0.03 to 0.07 g/cm$^3$, and the lower filament cushioning layer should possess a bulk density in the range of 0.09 to 0.4 g/cm$^3$, preferably 0.1 to 0.3 g/cm$^3$. It is similarly desirable that the upper filament cushioning layer should possess perviousness to air in the range of 400 to 1200 cm$^3$/cm$^2$/sec, preferably 600 to 800 cm$^3$/cm$^2$/sec and the lower filament cushioning layer should possess perviousness to air in the range of 200 to 800 cm$^3$/cm$^2$/sec, preferably 400 to 800 cm$^3$/cm$^2$/sec, and a superposed cushioning layer should possess perviousness to air in the range of 200 to 800 cm$^3$/cm$^2$/sec, preferably, 400 to 800 cm$^3$/cm$^2$/sec. One such cushioning material is obtained by shaping an aggregate of the aforementioned three-dimensionally curled short fibers of polyester filaments so as to impart partial directionality to the curls in such filaments and enable partially intertwined portions of curled filaments to be formed in varying shapes by expansion, contraction, and deformation in the direction in which the strength of load is desired to be exerted, causing the intertwined portions to be distributed in accordance with the strength required, applying adhesive agent to the resultant mass, then compressing this mass to a stated bulk density, and again applying adhesive agent thereto as required to bind the points of mutual contact of the filaments in the mass.

The filament cushioning layers mentioned above may be obtained, as disclosed in U.S. Pat. No. 4,172,174, for example, by loosening a packed mass of three-dimensionally curled polyester filaments, then molding the loosened mass of filaments in a stated shape, causing needles each provided at the leading end thereof with a barb to be thrust at a stated needle density by a stated number into desired portions of the resultant aggregate of three-dimensionally curled filaments at least from one side in the direction in which the strength of load is desired to be exerted, then applying adhesive agent to the resultant mass thereby binding the points of mutual contact of the curled filaments forming the mass, and optionally compressing the mass to a desired bulk density in the presence of steam. They may be otherwise produced, as disclosed in U.S. Ser. No. 292,907, by placing an aggregate of three-dimensionally curled short fibers of filaments on a conveying device, setting the conveying device into motion, causing a rotary member having a multiplicity of needle-shaped objects raised from the periphery thereof to rotate, allowing the aforementioned needle-shaped objects in rotation to come into contact with the aforementioned aggregate of short fibers of filaments thereby scraping off a desired portion of the aggregate and consequently preforming the aggregate in a shape, compressing the preformed aggregate of short fibers with an endless belt and/or rollers or some other means thereby giving rise to a block of filaments having a stated bulk density, needling this block of filaments by using barbed needles at a stated needle density (optionally subjecting the block of filaments to rubbing prior to compression molding), spraying adhesive agent downwardly onto the block of filaments on an endless belt travelling in a substantially horizontal direction or immersing the shaped block of filaments in a bath of adhesive agent and lifting the block from the bath, and drying the wet block by heating. The needling density for the cushioning material generally falls in the range of 1 to 100 needles/100 cm$^2$, and preferably in the range of 4 to 50 needles/100 cm$^2$. When necessary, the cushioning material is compressed in the presence of steam to 5 to 40%, preferably 10 to 30%, of the original volume. It is further wetted with adhesive agent and then dried by heating as occasion demands. This compression prevents the cushioning material from yielding to the phenomenon of "permanent set in fatigue." This cushioning material may be treated with a flame-retardant to acquire desired flame-retardancy.

The embodiment described above represents a case wherein the shaped mass of filaments is subjected to needling or rubbing so as to impart partial directionality to the curls in such filaments and enable partially intertwined portions of curled filaments to be formed in varying shapes by expansion, contraction, and deformation in the direction in which the strength of load is desired to be exerted, and causing the intertwined portions to be distributed in accordance with the strength required. The treatment of needling or rubbing is not always required. Depending on the purpose for which the cushioning material is used, the treatment may manifest its effect fully.

The upper and lower filament cushioning layers 1, 7 obtained as described above can be used in their unmodified form as parts for the cushioning material in vehicles. Optionally, a liquid moisture-setting adhesive agent may be applied to the entire surface of the upper filament cushioning layer 7, the aforementioned adhesive agent applied to the surface of the lower filament cushioning layer 1 destined to come into contact with the upper filament cushioning layer 7, and the two layers superposed and compressed in the presence of steam to join the two layers fast. Further, the two layers may have their respective bulk densities adjusted to have surface portions of the filaments stratified.

Typical examples of the adhesive agent to be used as described above in the cushioning material include synthetic rubbers such as styrene-butadiene rubber, acrylonitrilebutadiene rubber, chloroprene rubber, and urethane rubber, natural rubbers, vinyl type adhesive agents, vinyl acetate type adhesive agents, cellulose acetate type adhesive agents and acrylic type adhesive agents. They are used in the form of latex or solution.

In this case, the aforementioned various adhesive agents may be used either singly or as suitably combined. More desirable results are obtained by first mutually binding filaments with a synthetic rubber type adhesive agent and then treating the block of filaments with a natural rubber type adhesive agent. To be specific, the first use of a synthetic rubber type adhesive agent which provides excellent adhesion for synthetic fibers is effective in binding the points of mutual contact of filaments in the mass and the subsequent use of a natural rubber type adhesive agent is effective in improving the fastness of bondage formed with the synthetic rubber type adhesive agent, the flexibility of the cushioning material as a whole, the hysteresis loss of the cushioning material as a whole, and the permanent strain by compression. Besides, the synthetic rubber type adhesive agent applied in advance enables the rather insufficient adhesive strength the subsequently applied natural rubber type adhesive agent exhibits upon synthetic fibers to be enhanced. In this case, the synthetic rubber latex and the natural rubber latex are desired to be applied in substantially equal amounts. The combined amount of these two latexes thus applied is substantially equal to the amount of synthetic rubber latex used in the conventional cushioning material.

Desired adhesion of the upper and lower filament cushioning layers formed as described above is accomplished by spraying liquid adhesive agent downwardly on the two layers, spraying the adhesive agent inside the shaped layers Fc with the aid of a needle-shaped sprayer, or immersing the shaped layers Fc in a bath of the adhesive agent and then heating the wet layers at a temperature in the range of 80° to 200° C., preferably 100° to 160° C., for a period in the range of 10 to 60 minutes, preferably 15 to 40 minutes, thereby drying or vulcanizing the layers. The amount of the adhesive agent desired to be deposited is generally in the range of 10 to 150 g/100 g of filaments, preferably in the range of 50 to 100 g/100 g of filaments.

Figure 3:
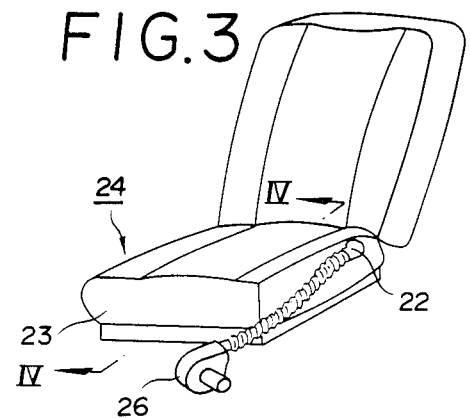
FIG. 3 is a perspective view of an automobile seat using a cushioned material of the present invention.
Figure 4:
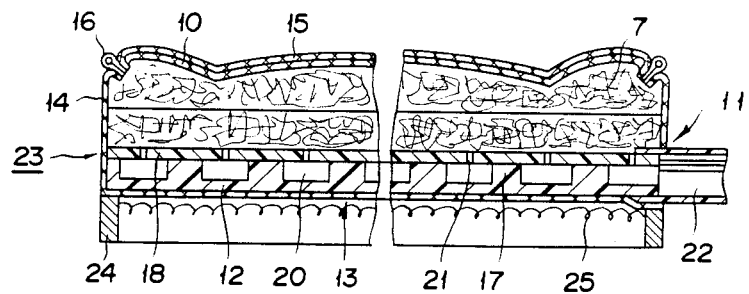
FIG. 4 is an enlarged cross-section taken along the line IV—IV in the diagram of FIG. 3.

The cushioning material thus obtained is used as an air-pervious seat in a vehicle such as automobile as illustrated in FIG. 3 and FIG. 4. Optionally, the upper and lower filament cushioning layers 1, 7 may be superposed by a thin air-pervious wadding 10 of felt or nonwoven fabric. The lateral portions 11 of the cushioning layers 1, 7 and the bottom portion 13 of a plate-shaped member 12 are covered with an air-impervious surface coating 14. The air-impervious coating 14 may be formed of jeans, tarpaulin, leather or artificial leather. The surface of the aforementioned cushioning layer 7 is covered with an air-pervious surface coating 15. The peripheral edge portion of the cushioning layer 7 is joined to the aforementioned air-impervious surface coating 14 by being directly sewn via a bulbed portion 16 or by some other method. The air-pervious surface coating 15 may be formed of meshed cloth such as, for example, lace cloth, curtain cloth, russel knit, russel knit incorporating jacquared weave, or woven fabric (preferably of coarse mesh).

The plate-shaped member 12 illustrated in FIG. 4 is made of rubber or polyethylene, polypropylene, or ethylene-vinyl acetate copolymer or some other similar polyolefin-polyvinyl chloride copolymer. It has a plurality of projections 17 formed therein as spaced by fixed intervals, for example. These projections 17 have a circular, elliptic, polygonal, or threadlike cross section. The number of such projections 17, the intervals separating them, and the shape thereof are determined in due consideration of the fact that they are expected to permit as uniform dispersion of incoming air as possible and provide sufficient support of the load exerted by the rider sitting on the seat. These projections 17 may be formed separately of the plate-shaped member and subsequently attached thereto. By the technique of blow molding, vacuum molding or cast molding, they may be formed integrally with the plate-shaped member. A sheetlike lid 18 is mounted on the surface of the plate-shaped member 12 and the projections. It is fastened to the plate-shaped member 12 by the periphery thereof and the portions thereof colliding with the tips of the projections 17. Thus, a multiplicity of air holes 19 are formed at stated intervals between the aforementioned projections 17. The shape, size, and quantity of these air holes 19 are determined in due consideration of the amount of air to be passed the uniformity of dispersion of air. An air dispersion chamber 20 of this structure may be integrally formed.

The air dispersion chamber 20 thus formed is provided along at least one lateral side thereof with an air introduction chamber 22 perforated by a plurality of air holes 21 communicating along the aforementioned lateral side with the aforementioned air dispersion chamber 20.

The seat member 23 constructed as described above is used as mounted on S-shaped springs 25, other springs or belts set in place as adjusted in a frame 24 of the seat.

To the aforementioned air dispersion chamber 20, at least one air introduction tube 22 is connected. This air introduction tube 22 is provided with a fan (such as, for example, a sirocco fan) 26 connected to a power source such as a motor (not shown). The source of air may be an air conditioner, a car cooler, the car's interior or the ambient air. The air thus supplied may be at room temperature, or it may be hot or cold. When the air source is to be connected to the air introduction tube 22, a switch valve such as a butterfly valve (not shown) may be interposed therebetween.

Now, the present invention will be described more specifically below with reference to working examples.

EXAMPLE 1

An aggregate of three-dimensionally curled polyester filaments 800 deniers in monofilament size was needled at a needle density of 9 needles/100 cm² and, with a moisture-setting type polyurethane adhesive agent (produced by Think Chemical Industry Co., Ltd. and marketed under trademark designation of THIN BOND 1008-50C) applied thereto, subsequently compressed in the presence of steam to produce a lower filament cushioning layer having a bulk density of 0.1 g/cm³ (80 g of adhesive agent per 100 g of filaments).

Separately, an aggregate of three-dimensionally curled polyester filaments 300 deniers in monofilament size was needled at a needle density of 9 needles/100 cm² and, with a moisture-setting type polyurethane adhesive agent (produced by Think Chemical Industry Co., Ltd. and marketed under trademark designation of THIN BOND 1008-50C) applied thereto, subsequently compressed to produce an upper filament cushioning layer having a bulk density of 0.05 g/cm³ (60 g of adhesive agent per 100 g of filaments).

The two cushioning layers were superposed. The resultant cushioning material was subjected to a total of 80,000 repeated compressions (by the method specified by JIS K6401). The apparent "permanent set in fatigue" was 5%. The decrease of the rigidity was 25%. The perviousness to air exhibited by this cushioning material was 20% higher than the cushioning material of a bulk density of 0.05 g/cm³ produced solely of three-dimensionally curled polyester filaments 300 deniers in monofilament size.

EXAMPLE 2

An aggregate of three-dimensionally curled polyester filaments 600 deniers in monofilament size was wetted with adhesive agent (produced by Sumitomo Chemical Industry Co., Ltd. and marketed under trademark designation of Sumikaflex 820) and then compressed in the presence of steam to produce a polyester lock material having a bulk density of 0.13 g/cm³ (80 g of adhesive agent per 100 g of filaments). This was used as a lower filament cushioning layer.

Separately, an aggregate of three-dimensionally curled polyester filaments 350 deniers in monofilament size was needled at a needle density of 9 needles/100 cm², then wetted with adhesive agent (produced by Sumitomo Chemical Industry Co., Ltd. and marketed under trademark designation of Sumikaflex 900H), and compressed in the presence of steam to produce a polyester lock material having a bulk density of 0.048 g/cm³ (40 g of adhesive agent per 100 g of filaments). This was used as an upper filament cushioning layer.

The two cushioning layers were superposed. The resultant cushioning material was subjected to a total of 80,000 repeated compressions. The development of this test was as shown in FIG. 5 (curve A). The hysteresis loss curves before and after the test were as shown in FIG. 6 (A) (curve C).

EXAMPLE 3

A cushioning material was produced by following the procedure of Example 2, except that the lower filament cushioning layer was obtained in a bulk density of 0.19 g/cm³ and the upper filament cushioning layer in a bulk density of 0.044 g/cm³. When this cushioning material was subjected to the same tests, the results were as shown in FIG. 5 (curve B) and FIG. 6 (B) (curve D).

As described above, this invention is directed to a cushioning material which comprises a lower filament cushioning layer of relatively high rigidity and high perviousness to air obtained by compression molding in a stated shape three-dimensionally curled short fibers of polyester filaments of a relatively large denier number thereby producing a shaped mass of filaments and applying adhesive agent to the shaped mass thereby binding the points of mutual contact of filaments therein and an upper filament cushioning layer of relatively low rigidity obtained by compression molding in a stated shape three-dimensionally curled short fibers of polyester filaments of a smaller denier number than the aforementioned polyester filaments thereby producing a shaped mass of filaments and applying adhesive agent to the shaped mass thereby binding the points of mutual contact of filaments therein, with the aforementioned upper layer superposed on the aforementioned lower layer. When this cushioning material is used in an automobile seat whose slab material and surface coating are amply pervious to air, the air introduced through at least one air inlet into the lower part of the lower filament cushioning layer is allowed to pass into the cushioning material and keep the temperature of the seat as a whole at a suitable level. If the lower part and the lateral faces of the lower filament cushioning layer are too tightly closed to permit the air to rise into the upper filament cushioning layer, then the air adjusted to a suitable temperature is driven through the cushioning material and dispersed throughout the seat by the air-conditioner's fan installed in the automobile. For the purpose of eliminating the phenomenon of "permanent set in fatigue" due to repeated occupation of the seat by the rider, improving the stability of elasticity, and preserving the high perviousness to air, the combined use of the lower layer enjoying high perviousness to air and high elasticity and the upper layer enjoying suitable elasticity and sufficient perviousness to air brings about highly desirable results.

What is claimed is:

1. A cushioning material, comprising a lower filament cushioning layer of relatively high rigidity and high perviousness to air obtained by compression molding in a stated shape three-dimensional curled short fibers of polyester filaments of a relatively large denier number thereby producing a shaped mass of filaments and applying adhesive agent to the shaped mass thereby binding the points of mutual contact of filaments therein and an upper filament cushioning layer of relatively low rigidity obtained by compression molding in a stated shape three-dimensionally curled short fibers of polyester filaments of a smaller denier number than said polyester filaments thereby producing a shaped mass of filaments and applying adhesive agent to the shaped mass thereby binding the points of mutual contact of filaments therein, with said upper layer superposed on said lower layer.

2. A cushioning material according to claim 1, wherein the filaments in said upper filament cushioning layer have a monofilament size in the range of 100 to 500 deniers and the filaments in said lower filament cushioning layer have a monofilament size in the range of 300 to 2,000 deniers.

3. A cushioning material according to claim 1, wherein the filaments in said upper filament cushioning layer have a monofilament size in the range of 200 to 400 deniers and the filaments in said lower filament cushioning layer have a monofilament size in the range of 350 to 1,000 deniers.

4. A cushioning material according to claim 1, wherein said two filament cushioning layers have a bulk density in the range of 0.02 to 0.4 g/cm³.

5. A cushioning material according to claim 1, wherein said upper filament cushioning layer has a bulk density in the range of 0.02 to 0.08 g/cm³ and the lower filament cushioning layer has a bulk density in the range of 0.09 to 0.4 g/cm³.

6. A cushioning material according to claim 2, wherein said upper filament cushioning layer has a bulk density in the range of 0.3 to 0.7 g/cm³ and said lower filament cushioning layer has a bulk density in the range of 0.1 to 0.3 g/cm³.

* * * * *

UNITED STATES PATENT AND TRADEMARK OFFICE
CERTIFICATE OF CORRECTION

PATENT NO. : 4,563,387

DATED : January 7, 1986

INVENTOR(S) : Sadaaki Takagi, Shigetsugu Yura, Masaki Fukuda and Yukio Oikawa

It is certified that error appears in the above-identified patent and that said Letters Patent is hereby corrected as shown below:

Sheet 2 of the drawings, FIG. 5, righthand side of the drawings;
"DEGREASE" should read -- DECREASE --

Signed and Sealed this

Thirteenth Day of May 1986

[SEAL]

Attest:

Attesting Officer

DONALD J. QUIGG

Commissioner of Patents and Trademarks